United States Patent Office 2,841,627
Patented July 1, 1958

2,841,627
METHOD OF PRESERVING A RUBBER WITH AN α,α'-BIS(HYDROXYPHENYL)-2,6-XYLENOL AND RESULTING COMPOSITIONS

David J. Beaver, Richmond Heights, and Paul J. Stoffel, Florissant, Mo., assignors to Monsanto Chemical Company, St. Louis, Mo., a corporation of Delaware No Drawing. Application October 10, 1952
Serial No. 314,204

7 Claims. (Cl. 260—810)

The present invention relates to a method of retarding or preventing the deterioration of a rubber due to aging or exposure to the atmosphere and to the rubber compositions so obtained. It has long been known that such deterioration can be greatly retarded by treating the rubber before or after vulcanization with certain substances known as age resistors or antioxidants. The present invention provides a new class of antioxidants for rubber which have the advantage of not discoloring the rubber. They are, accordingly, useful for the production of light colored rubber goods.

The antioxidants or age resistors of this invention are trisphenols. In these compounds one of the hydrogen atoms in each of the methyl groups of 2,6-xylenol is replaced by a phenolic substituent. This class of compounds may be called α,α'-bis(hydroxyphenyl)-2,6-xylenols. The phenolic nuclei may be further substituted. In fact it is preferred that each nucleus contain at least one methyl group. Compounds of this class substituted by alkyl groups containing one to four carbon atoms or aralkyl groups or chlorine have also exhibited antioxidant activity but increasing the size of the substituent above methyl or replacing the methyl group by chlorine has in general lowered the activity. The trisphenols which have exhibited optimum properties may be represented by the structural formula

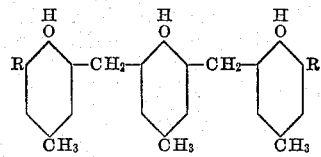

where the R's represent hydrogen or a methyl group.

The antioxidants may be incorporated into the rubber by milling or similar procedure or added to the rubber in the form of latex before coagulation or applied to the surface of a mass of crude or vulcanized rubber. Thus, the term "treating" is employed in a generic sense.

The following are specific embodiments of the invention illustrating the use of the new antioxidants. Rubber stocks suitable for manufacture of white rubber goods were compounded comprising

| Stock | A | B | C |
|---|---|---|---|
| | Parts by weight | | |
| Pale crepe rubber | 100 | 100 | 100 |
| Zinc oxide | 60 | 60 | 60 |
| Lithopone | 20 | 20 | 20 |
| Sulfur | 2 | 2 | 2 |
| Diphenylguanidine phthalate | 0.820 | 0.820 | 0.820 |
| 2-Benzothiazolyl thiolbenzoate | 0.625 | 0.625 | 0.625 |
| Paraffin | 0.250 | 0.250 | 0.250 |
| α²,α⁶-Bis(6-hydroxy-m-tolyl)mesitol | | 1.0 | |
| α²,α⁶-Bis(6-hydroxy-3,5-xylyl)mesitol | | | 1.0 |

The stocks were cured in the usual manner by heating in a press at 126° C. and then artificially aged by heating in a bomb at 121° C. under 80 pounds air pressure per square inch. The physical properties of the cured compositions before and after aging are set forth below:

Table I

| Stock | Hrs. Aged | Cure Time in Mins. | Modulus of Elasticity in lbs./in.² at Elongation of 500% | Tensile at Break in lbs./in.² | Ult. Elong. percent |
|---|---|---|---|---|---|
| A | 0 | 45 | 1,990 | 3,910 | 645 |
| B | 0 | 45 | 2,003 | 4,130 | 676 |
| C | 0 | 45 | 1,923 | 4,343 | 683 |
| A | 0 | 60 | 2,300 | 4,390 | 666 |
| B | 0 | 60 | 2,045 | 3,700 | 640 |
| C | 0 | 60 | 2,115 | 3,925 | 650 |
| A | 12 | 45 | 815 | 870 | 515 |
| B | 12 | 45 | 1,480 | 1,763 | 556 |
| C | 12 | 45 | 1,916 | 2,255 | 555 |
| A | 12 | 60 | 906 | 943 | 516 |
| B | 12 | 60 | 1,465 | 1,555 | 520 |
| C | 12 | 60 | 1,766 | 2,096 | 546 |

The same stocks were also artificially aged by heating in a bomb at 70° C. under 300 pounds oxygen pressure per square inch. As illustrative of the antioxidant activity, the percent of the original tensile strength of the 60 minute cure retained after aging is set forth in the first column of the table below. Additionally, the resistance to discoloration of the compositions containing the antioxidants as compared to the untreated stock was evaluated by means of a photovolt reflectance meter calibrated against a standard of magnesium oxide as 100. The percent of light reflected from the surface of the cured stocks after 10 days exposure to an S-1 sunlamp is set forth in the second column. It will be noted that the incorporation of the antioxidants resulted in no decrease at all in the light reflected.

Table II

| Stock | Percent of Original Tensile Retained after Aging | Percent Light Reflectance |
|---|---|---|
| A | 68 | 69 |
| B | 86 | 69 |
| C | 88 | 70 |

As has been stated, replacement of one or more of the methyl groups by chlorine is permissible. For example antioxidant activity was exhibited by 4-chloro-α,α'-bis(5-chloro-2-hydroxyphenyl) - 2,6-xylenol, α²,α⁶-bis(5-chloro-2-hydroxyphenyl)mesitol and α²,α⁶-bis(5-chloro-2-hydroxy-m-tolyl)mesitol. However, the antioxidant activity was considerably weaker than that exhibited by the foregoing compounds.

As further specific embodiments of the invention rubber stocks were compounded employing the same base composition as described above and compared to the untreated base. Thus, the composition of Stock D below is the same as Stock A above but Stock D was cured and aged at the same time as Stocks E and F.

| Antioxidant | Stock | | |
|---|---|---|---|
| | D | E | F |
| | Parts by weight | | |
| None | | | |
| α²,α⁶-Bis(6-hydroxy-m-tolyl)durenol | | 1.0 | |
| α²,α⁶-Bis(5-α,α-dimethylbenzyl-2-hydroxyphenyl)mesitol | | | 1.0 |

These stocks were cured in a press at 126° C. and artificially aged by heating in a bomb at 121° C. under 80 pounds air pressure per square inch. The modulus and tensile properties before and after aging as compared to the base containing no antioxidant are set forth below:

*Table III*

| Stock | Hrs. Aged | Cure Time in Mins. | Modulus of Elasticity in lbs./in.$^2$ at Elongation of 500% | Tensile at Break in lbs./in.$^2$ | Ult. Elong., Percent |
|---|---|---|---|---|---|
| D | 0 | 45 | 1,836 | 4,343 | 695 |
| E | 0 | 45 | 1,510 | 3,434 | 675 |
| F | 0 | 45 | 2,090 | 4,335 | 675 |
| D | 0 | 60 | 1,685 | 4,175 | 710 |
| E | 0 | 60 | 1,620 | 3,710 | 680 |
| F | 0 | 60 | 2,020 | 3,845 | 630 |
| D | 9 | 45 | 676 | 743 | 580 |
| E | 9 | 45 | 1,310 | 1,732 | 600 |
| F | 9 | 45 | 1,180 | 1,635 | 590 |
| D | 9 | 60 | 625 | 750 | 570 |
| E | 9 | 60 | 1,346 | 1,766 | 603 |
| F | 9 | 60 | 1,080 | 1,256 | 546 |

In addition the resistance of the stocks to discoloration was determined in the manner described after 10 days exposure to an S-1 sunlamp.

*Table IV*

| Stock | Cure Time in Mins. | Percent Light Reflectance |
|---|---|---|
| D | 45 | 73 |
| E | 45 | 68 |
| F | 45 | 69 |
| D | 60 | 71 |
| E | 60 | 68 |
| F | 60 | 71 |

As a still further specific embodiment of the invention a rubber stock was compounded by adding one part of antioxidant to the base above described and the properties before and after aging compared to the base stock designated as G in the series:

| Antioxidant | Stock G | Stock H |
|---|---|---|
| | Parts by Weight | |
| None | | |
| $\alpha^2,\alpha^6$-Bis(6-hydroxy-m-tolyl)-4-tert-butyl-2,6-xylenol | | 1.0 |

The stocks were cured in a press at 126° C. and the vulcanizates artificially aged by heating at 100° C. for 96 hours in a circulating air oven. The modulus and tensile properties before and after aging were as follows:

*Table V*

| Stock | Hrs. Aged | Cure Time in Mins. | Modulus of Elasticity in lbs./in.$^2$ at Elongation of 500% | Tensile at Break in lbs./in.$^2$ | Ult. Elong., Percent |
|---|---|---|---|---|---|
| G | 0 | 45 | 2,455 | 4,245 | 650 |
| H | 0 | 45 | 2,440 | 4,455 | 665 |
| G | 0 | 60 | 2,430 | 4,530 | 665 |
| H | 0 | 60 | 2,205 | 4,300 | 675 |
| G | 96 | 45 | | 715 | 485 |
| H | 96 | 45 | 1,560 | 1,610 | 520 |
| G | 96 | 60 | | 760 | 450 |
| H | 96 | 60 | 1,570 | 1,586 | 506 |

Similarly, antioxidant activity in a rubber composition was exhibited by $\alpha^2,\alpha^6$-bis(5-tert-butyl-2-hydroxy-m-tolyl)mesitol although the activity was reduced somewhat by the presence of the larger groups. Furthermore, having the hydroxyl group present in the 4- instead of the 2-position did not destroy the antioxidant activity although $\alpha^2,\alpha^6$-bis(5-tert-butyl-4-hydroxyl-m-tolyl)mesitol was significantly weaker.

Although some of the antioxidants are new chemical compounds, they may be prepared by methods analogous to those described in the chemical literature. Typical examples of the preparation and properties of some of the compounds are described below.

The sodium salt of 2-hydroxy-$\alpha^1,\alpha^3$-mesitylenediol was prepared by condensing formaldehyde and p-cresol in the molecular ratio of 2:1 in 25% aqueous caustic soda. After two days at room temperature or two hours at 100° C. the reaction was complete and the lustrous plates were dissolved in water and the solution acidified to a pH of about 6 with 1:2 acetic acid. 2-hydroxy-$\alpha^1,\alpha^3$-mesitylenediol was obtained in 93% yield as brilliant white prisms from ethyl acetate, M. P. 128.4–129.1° C. 16.8 parts by weight of the 2-hydroxy-$\alpha^1,\alpha^3$-mesitylenediol so prepared was added to a two molar excess of p-cresol and 2 parts by weight hydrochloric acid added thereto. The temperature rose steadily to about 95° C. due to the heat of reaction. The reaction was essentially complete in about ten minutes. The mixture was then cooled, slurried with petroleum ether and filtered. The $\alpha^2,\alpha^6$-bis(6-hydroxy-m-tolyl)mesitol was obtained in a 92% yield as white prisms, from ethyl acetate, M. P. 215.2–216.0° C.

From the reaction of 2-hydroxy-$\alpha^1,\alpha^3$-mesitylenediol and 2,4-di-tert-amylphenol there was obtained $\alpha^2,\alpha^6$-bis(2-hydroxy-3,5-di-tert-amylphenyl)mesitol, M. P. 85.6–86.0° C. although in poor yield.

Reaction of 2-hydroxy-$\alpha^1,\alpha^3$-mesitylenediol and 2,4-xylenol gave the desired $\alpha^2,\alpha^6$-bis(6-hydroxy-3,5-xylyl)-mesitol as a white crystalline solid, M. P. 183.6–184.2° C.

Condensation of 2-hydroxy-$\alpha^1,\alpha^3$-mesitylenediol with 4-tert-butyl-o-cresol gave a 71.5% yield of $\alpha^2,\alpha^6$-bis(5-tert-butyl-2-hydroxy-m-tolyl)mesitol obtained as white rosettes from benzene, M. P. 192–193° C.

Condensation of 2-hydroxy-$\alpha^1,\alpha^3$-mesitylenediol with p-$\alpha,\alpha$-dimethylbenzylphenol gave $\alpha^2,\alpha^6$-bis(5-$\alpha,\alpha$-dimethylbenzyl-2-hydroxyphenyl)mesitol. This product was a fine white powder, M. P. 218–219° C.

Condensation of 2-hydroxy-$\alpha^1,\alpha^3$-mesitylenediol with o-tert-butyl-o-cresol in toluene solution employing hydrochloric acid as condensation catalyst gave $\alpha^2,\alpha^6$-bis(5-tert-butyl-4-hydroxy-m-tolyl)mesitol. The product after recrystallizing from petroleum ether was a white powder, M. P. 133–134° C.

5-tert-butyl-2-hydroxy-m-xylene-$\alpha,\alpha'$-diol was prepared by treating p-tert-butylphenol with an excess of aqueous formaldehyde and strong alcoholic caustic. The mixture was allowed to stand for three days at room temperature and the fine white needles separated by filtration and recrystallized from petroleum ether, M. P. 88.2–89.0° C. The addition of hydrochloric acid to a mixture of p-cresol and the 2,6-dimethylol-p-tert-butylphenol so prepared at 45° C. gave a good yield of $\alpha^2,\alpha^6$-bis(6-hydroxy-m-tolyl)-4-tert-butyl-2,6-xylenol as nacreous plates from petroleum ether, M. P. 135–136° C.

$\alpha^2,\alpha^6$-bis(6-hydroxy-m-tolyl)durenol was obtained in good yield by condensing p-cresol with 6-hydroxy-$\alpha^1,\alpha^5$-durenediol. The product was a fine white crystalline powder from benzene, M. P. 191–192° C.

Although natural rubber has been selected to illustrate the invention, the term "a rubber" is employed in a generic sense to define a sulfur vulcanizable polymer and includes reclaimed rubber, balata, gutta percha and synthetically prepared rubber diene polymers, as for example a butadiene-1,3 polymer, copolymers of butadiene-1,3 with styrene or acrylonitrile and the like. In general the antioxidants herein described are effective for the preservation of organic substances which deteriorate by absorption of oxygen from the air.

It is intended to cover all changes and modifications of the examples of the invention herein chosen for purposes of disclosure which do not constitute departures from the spirit and scope of the invention.

What is claimed is:

1. A method of preserving a sulfur vulcanizable diene polymer rubber which comprises incorporating therein α,α'-bis(6-hydroxyphenyl)-2,6-xylenol.

2. A vulcanized diene polymer rubber preserved by having incorporated therein a compound of the structure

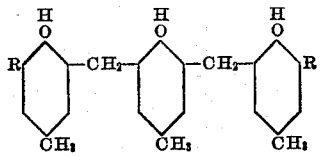

where R is selected from the group consisting of hydrogen and methyl groups.

3. A vulcanized diene polymer rubber preserved by having incorporated therein a compound of the structure

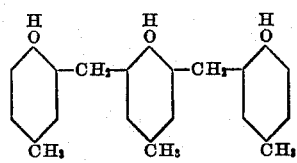

4. A vulcanized diene polymer rubber preserved by having incorporated therein a compound of the structure

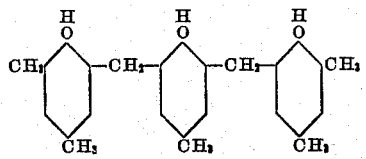

5. Unvulcanized rubber having incorporated therein a compound of the structure

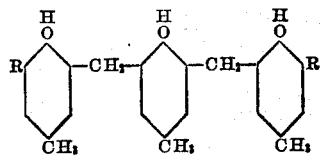

where R is selected from the group consisting of hydrogen and methyl groups.

6. Unvulcanized rubber having incorporated therein a compound of the structure

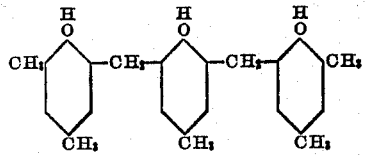

7. A composition containing a sulfur vulcanizable diolefinic rubbery polymer and as an antioxidant a compound of the formula:

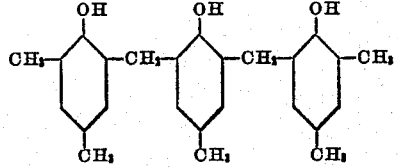

References Cited in the file of this patent

UNITED STATES PATENTS 2,628,953   Newly _____ Feb. 17, 1953

OTHER REFERENCES

"The India Rubber Journal," October 24, 1931, pages 535 and 536.

Ind. Eng. Chem. 41, 1442–1447 (July 1949).